No. 687,533. Patented Nov. 26, 1901.
T. KITCHIN.
CHUCK OR WORK HOLDER.
(Application filed May 21, 1901.)
(No Model.)
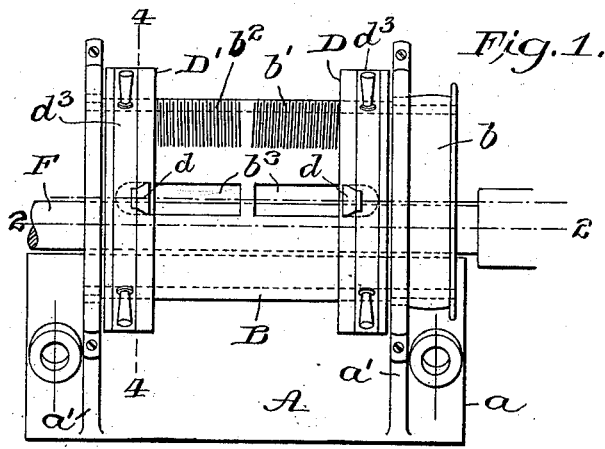
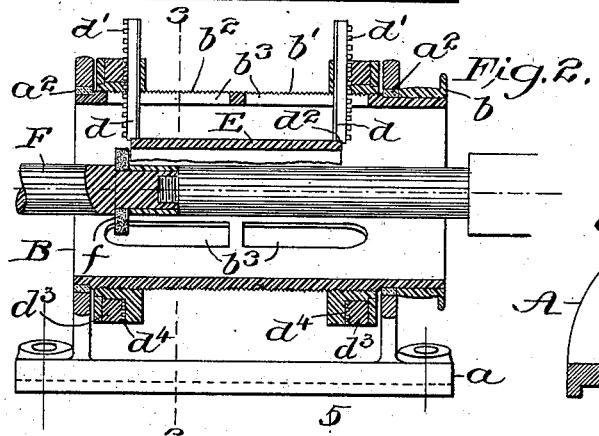
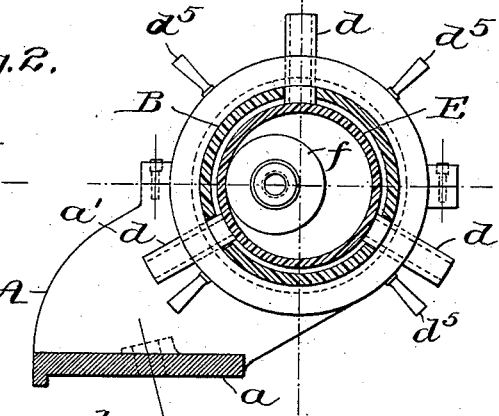
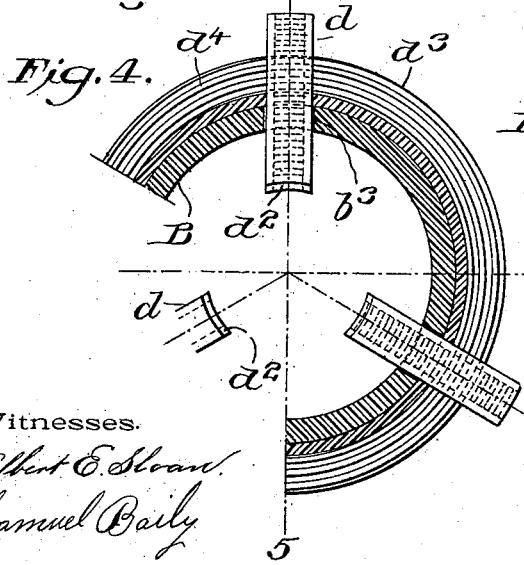
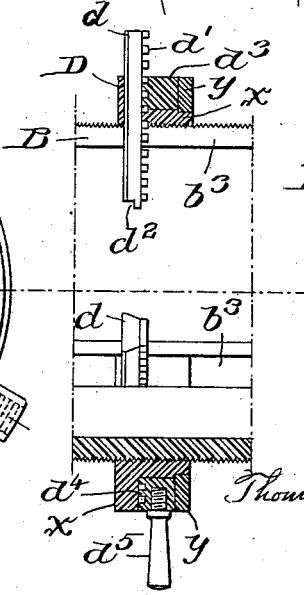
Witnesses.
Albert E. Sloan
Samuel Baily
Inventor.
Thomas Kitchin

UNITED STATES PATENT OFFICE.

THOMAS KITCHIN, OF PHILADELPHIA, PENNSYLVANIA.

CHUCK OR WORK-HOLDER.

SPECIFICATION forming part of Letters Patent No. 687,533, dated November 26, 1901.

Application filed May 21, 1901. Serial No. 61,233. (No model.)

*To all whom it may concern:*

Be it known that I, THOMAS KITCHIN, a citizen of the United States, residing in the city and county of Philadelphia, in the State of Pennsylvania, have invented certain new and useful Improvements in Chucks or Work-Holders, of which the following is a full, clear, and exact description, reference being had to the accompanying drawings, forming a part of this specification.

This invention is a chuck or work-holder of simple and efficient construction and operation designed for use more especially in connection with or as an attachment for grinding-machines to facilitate and insure the accurate grinding internally of bushings and other tubular devices of varying lengths and diameters.

The invention, stated generally, comprises in a chuck a bodily-rotatable sleeve or hollow support having thereon a pair of oppositely-disposed longitudinally-adjustable members carrying each a set of radially-movable jaws, which extend through longitudinal openings in the wall of the sleeve, and coacting connections between said members and their respective jaws, whereby said members and their jaws may be bodily adjusted longitudinally of the sleeve and whereby the jaws may be adjusted radially of the sleeve. The said chuck is adapted to be mounted eccentrically in respect to the grinding-wheel and its shaft to the end that the inner wall of the bushing will be presented progressively to said wheel.

The invention also comprises various novel constructions and combinations of parts, which will be hereinafter particularly described and claimed.

In the drawings, Figure 1 is a plan of a chuck embodying my invention. Fig. 2 is a vertical section thereof as on the line 2 2 of Fig. 1, showing a portion of a bushing held thereby. Fig. 3 is a transverse section as on the line 3 3 of Fig. 2. Fig. 4 is a partial transverse section, enlarged, as on the line 4 4 of Fig. 1. Fig. 5 is a vertical section as on the line 5 5 of Fig. 4.

A is a bracket or support of suitable shape and size for its intended purpose. In the present instance it comprises a base $a$, with overhanging uprights $a'$, in which are provided boxes or bearings $a^2$ for a rotatable sleeve B. This sleeve is equipped at one end with a pulley $b$, by means of which it may be positively driven. It is also externally screw-threaded from about the middle of its periphery toward its respective ends, one portion being provided with a right-hand thread $b'$ and the other with a left-hand thread $b^2$. Each portion is also provided with a series of equally-spaced longitudinal slots $b^3$—in the present instance three. Screwed onto the respective ends of the sleeve are rings D D', respectively, provided each with three radially-movable jaws $d$, that extend through the adjacent slots in the sleeve. One side of each of the jaws is provided throughout its length with a series of teeth $d'$, similarly to a gear-rack, and the inner extremity of the jaw is preferably shouldered, as at $d^2$. Rotatably fitted to a circumferential groove in each of the rings is an independent ring $d^3$, on one face of which is a spiral thread $d^4$, which coacts with the teeth of the proximate jaws, whereby when the ring $d^3$ is properly turned the several jaws connected therewith will be moved as a unit radially toward or from the center of the sleeve, as desired. This ring $d^3$ is preferably provided with radially-extending handles $d^5$ to facilitate its manipulation.

Each of the rings D D' is preferably, though not essentially, formed in two parts, one part $x$ being of L shape cross-section, provided in its vertical flange with radial dovetail grooves for the reception and guidance of the radially-movable jaws, which in cross-section match the grooves, and the other part $y$ being a plain backing-ring screwed or otherwise affixed to the horizontal flange of the part $x$ to afford the circumferential groove for the spirally-threaded ring.

The bracket A is adapted to be bolted or otherwise secured to the bed or table of an ordinary grinding-machine.

The bushing E or other tubular object to be internally ground is inserted in the sleeve, and the rings D D', with their respective jaws retracted, are screwed along the sleeve toward the respective ends of the work. The rings $d^3$ are then turned to move the respective jaws into the sleeve and set their shouldered extremities against the opposing ends of the work, thereby securely clamping and centering the same within the sleeve. The shaft F of the grinding-machine extends eccentrically through the sleeve, so that the inner wall of the bushing during the rotation of the chuck is presented progressively to the grinding-wheel $f$ on said shaft.

The threads of the companion rings D $d^3$ are right hand and the threads of the companion rings D' $d^3$ left hand. Hence by reason of the necessary direction of movement of the sleeve in its bearings, as indicated by the arrow in Fig. 3, a secure and effective clamping of the jaws upon the work is insured during the grinding operation.

It will be seen that owing to their capacity for adjustment longitudinally of the axis of the sleeve, as well as radially thereof, the jaws may be applied to work of varying lengths and diameters.

I claim—

1. In a chuck, an externally-threaded sleeve provided with longitudinal slots or openings, a threaded ring screwed onto said sleeve, radially-movable jaws in said ring provided with gear-teeth and extended through said slots or openings, and an independently-rotatable ring provided with a spiral thread coacting with said teeth, said latter ring being independently rotatable on the ring first named.

2. In a chuck, a hollow support, a pair of oppositely-disposed members thereon adjustable toward and from each other, radially-movable jaws in said members, and means on said members for radially adjusting the jaws.

3. In a chuck, a hollow support, a pair of oppositely-disposed members thereon adjustable toward and from each other, radially-movable jaws in said members provided with gear-teeth, and rings on said members provided with spiral threads coacting with the teeth of the respective jaws.

4. The combination with a supporting member provided with boxes or bearings, of a sleeve mounted therein provided with oppositely-disposed screw-threads on its periphery and with longitudinal slots, screw-threaded rings fitted to the respective threaded portions of the sleeve, jaws in said rings movable radially through the slots in the sleeve, said jaws being provided with gear-teeth, and rotatable members on said rings provided with spiral threads coacting with the teeth of the jaws, respectively.

5. The combination with a supporting member provided with boxes or bearings, of a sleeve mounted therein provided with oppositely-disposed screw-threads on its periphery and with longitudinal slots, screw-threaded rings fitted to the respective threaded portions of the sleeve, jaws in said rings movable radially through the slots in the sleeve, said jaws being provided with gear-teeth, and being shouldered at their inner extremities, and rotatable members on said rings provided with spiral threads coacting with the teeth of the jaws.

In testimony whereof I have hereunto affixed my signature in the presence of two subscribing witnesses.

THOMAS KITCHIN.

Witnesses:
ANDREW V. GROUPE,
JOHN R. NOLAN.